(12) United States Patent
Fang et al.

(10) Patent No.: US 9,565,435 B2
(45) Date of Patent: Feb. 7, 2017

(54) DEVICES AND METHODS FOR CONTEXT REDUCTION IN LAST SIGNIFICANT COEFFICIENT POSITION CODING

(71) Applicant: Google Technology Holdings LLC, Mountain View, CA (US)

(72) Inventors: Xue Fang, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 373 days.

(21) Appl. No.: 13/758,770

(22) Filed: Feb. 4, 2013

(65) Prior Publication Data

US 2013/0202026 A1    Aug. 8, 2013

Related U.S. Application Data

(60) Provisional application No. 61/595,072, filed on Feb. 4, 2012, provisional application No. 61/595,138, filed on Feb. 5, 2012, provisional application No. 61/597,033, filed on Feb. 9, 2012.

(51) Int. Cl.
| | |
|---|---|
| H04N 7/26 | (2006.01) |
| H04N 19/90 | (2014.01) |
| H04N 19/91 | (2014.01) |
| H04N 19/13 | (2014.01) |
| H04N 19/102 | (2014.01) |

(52) U.S. Cl.
CPC ...... *H04N 19/00945* (2013.01); *H04N 19/102* (2014.11); *H04N 19/13* (2014.11); *H04N 19/91* (2014.11)

(58) Field of Classification Search
CPC ....... H04N 19/13; H04N 19/91; H03M 7/4018
See application file for complete search history.

(56) References Cited

U.S. PATENT DOCUMENTS

| | | |
|---|---|---|
| 6,014,095 A | 1/2000 | Yokoyama |
| 7,158,684 B2 | 1/2007 | Cheung et al. |
| 2005/0123207 A1 | 6/2005 | Marpe et al. |

(Continued)

FOREIGN PATENT DOCUMENTS

| | | |
|---|---|---|
| WO | WO2008153270 | 12/2008 |
| WO | WO2011142817 A1 * | 11/2011 |
| WO | WO2012095488 | 7/2012 |

OTHER PUBLICATIONS

Aaron Kiely: "Selecting the Golomb Parameter in Rice Coding", IPN Progress Report,, vol. 42-159, Nov. 15, 2004, all pages.

(Continued)

*Primary Examiner* — Zhubing Ren
(74) *Attorney, Agent, or Firm* — Young Basile Hanlon & MacFarlane, P.C.

(57) ABSTRACT

A method of video encoding includes encoding a position of a last non-zero coefficient within a video block having a first width. The position of the last non-zero coefficient is provided as a string of binary values, wherein each binary value in said string corresponds to a bin index value. The method also includes determining a context index value for each bin index value, wherein the context index value for each bin index value is configured to be shared across two or more blocks of different widths.

39 Claims, 16 Drawing Sheets

(56) References Cited

U.S. PATENT DOCUMENTS

| | | |
|---|---|---|
| 2006/0103556 A1 | 5/2006 | Malvar |
| 2007/0154090 A1 | 7/2007 | Howard |
| 2008/0013633 A1 | 1/2008 | Ye et al. |
| 2008/0231483 A1 | 9/2008 | He et al. |
| 2008/0266151 A1 | 10/2008 | Sankaran |
| 2008/0267513 A1 | 10/2008 | Sankaran |
| 2008/0310503 A1 | 12/2008 | Lee et al. |
| 2009/0175332 A1 | 7/2009 | Karczewicz et al. |
| 2009/0232204 A1 | 9/2009 | Lee et al. |
| 2011/0206289 A1 | 8/2011 | Dikbas et al. |
| 2012/0128067 A1 | 5/2012 | Liu et al. |
| 2012/0230402 A1* | 9/2012 | Auyeung et al. ........ 375/240.12 |
| 2013/0016789 A1 | 1/2013 | Lou et al. |
| 2013/0101046 A1 | 4/2013 | Korodi et al. |
| 2013/0114685 A1 | 5/2013 | Kerofsky et al. |
| 2013/0114698 A1 | 5/2013 | Lou et al. |
| 2013/0114738 A1* | 5/2013 | Chien et al. ............. 375/240.24 |
| 2013/0182758 A1 | 7/2013 | Seregin et al. |
| 2013/0182773 A1 | 7/2013 | Seregin et al. |
| 2013/0188694 A1 | 7/2013 | Lou et al. |
| 2013/0188727 A1 | 7/2013 | Lou et al. |
| 2013/0188729 A1 | 7/2013 | Lou et al. |
| 2013/0188734 A1 | 7/2013 | Kim et al. |
| 2013/0195182 A1 | 8/2013 | Kung et al. |
| 2013/0195370 A1 | 8/2013 | Sasai et al. |
| 2013/0202029 A1 | 8/2013 | Lou et al. |
| 2013/0230097 A1 | 9/2013 | Sole Rojals et al. |
| 2013/0322547 A1 | 12/2013 | Lou et al. |

OTHER PUBLICATIONS

Auyeung, et al.; Context Reduction of Significance Map Coding With CABAC; JCTVC-G1015; 7th Meeting: Geneva, CH, Nov. 21-30, 2011.

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.

Hseising et al., "CABAC and ABT" Joint Video Team (JVT) of ISO/IEC MEPG & ITU-T VCEG (ISO/IEC JTC1/SC29/W1 and ITU-T SG16 Q.6) 4th Meeting: Kalgenfurt, Austria; Jul. 22-26, 2002; 14 pages.

ISR, "ISR Search Report and Written Opinion of the International Searching Authority" for International Application No. ISR/US2012/046960 dated Feb. 25, 2013, 19 pages.

ISR, "ISR Search Report and Written Opinion of the International Searching Authority" for International Application No. ISR/US2012/064229 dated Feb. 4, 2014, 1220 pages.

ISR, "ISR Search Report and Written Opinion of the International Searching Authority" for International Application No. ISR/US2013/022312 dated 2013 Apr. 2013, 14 pages.

ISR, "ISR Search Report and Written Opinion of the International Searching Authority" for International Application No. ISR/US2013/022306 dated Mar. 28, 2013, 14 pages.

ISR & Written Opinion of the International Searching Authority for International Application No. ISR/US2013/024786, May 21, 2013, 11 pages.

Kurcerin et al., "Improvements on CABAC" ITU-Telecommunications Standardization Sector; Study Group 16 Question 6; Video Coding Experts Group (VCEG) 14th Meeting: Santa Barbara, CA, USA; Sep. 24-27, 2001; 6 pages.

Lou J et al.: "On coeff_abs_level_minus3 coding", 7 JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/,,No. JCTVC-G700, Nov. 9, 2011, all pages.

Malvar HS: "Adaptive run-length/Golomb-Rice encoding of quantized generalized Gaussian sources with unknown.statistics," Proceddings, DCC 2006, Data Compression Conference, Mar. 28, 2006-Mar. 30, 2006, all pages, IEEE Compt. Society Los Alamitos, CA USA.

Marpe et al., Context-Based Adaptive Binary Arithmetic Coding in the H.264/AVC Video Compression Standard, Detlev marple, IEEE Transactions on Circuits and Systems for Video Technology, vol. 13, No. 7, Jul. 2003, 17 pages.

Wien, Mathias "Variable Block-Size Transforms for Hybrid Video Coding" Dissertation Der Rheinisch-Westfaelischen Technischen Hochschule Aachen; Aachen, Germany; Feb. 3, 2004; 184 pages.

Nguyen (Fraunhofer HHI)T: "CE:11 Coding of Transform Coefficient Levels with Golomb-Rice codes," Mar. 10, 2011, all pages.

Nguyen et al., "Proposed Cleanup for Transform Coefficient Coding," Joint Collaborative Team on Video Coding JCTVC-H0228, Feb. 1, 2012.

Nguyen T et al.: "Reduced-complexity entropy coding of transform coefficient labels using a combination of VLC and PIPE,", 4. JCT-VC Meeting; 95. Mpeg Meeting; Jan. 20, 2011-Jan. 28, 2011; Daegu; (Joint Collaborative Team on Video Coding of ISO/IEC JTC1/SC29/WG11 and ITU-T SG16); URL: http://wftp3.itu.int/av-arch/jctvc-site/. No. JCTVC-D336, Jan. 16, 2011 all pages.

Nguyen, et al.; Multi-Level Significance Maps for Large Transform Units; JCTVC-G644; 7th Meeting: Geneva, Nov. 21-30, 2011.

Nguyen, Tung et al.: "Reduced-complexity entropy coding of transform coefficient levels using truncated golomb-rice codes in video compression", Image Processing (ICIP), 2011 18th IEEE Internation Conference on, IEEE, Sep. 11, 2011, all pages.

Office Action mailed Dec. 18, 2014 in co-pending Japanese Application.

Sole et al., "Unified scans for the significance map and coefficient level coding in high coding efficiency," Joint Collaborative Team on Video Coding, JCTVCF-288 Geneva, Jul. 8, 2011.

Sole, et al.; NON-CE11: Diagonal Sub-Block Scan for the Residual Coding; JCTVC-G323; 7th Meeting: Geneva, CH, Nov. 21-30, 2011.

Sze, "Reduction in contexts used for significant coeff flag and coefficient level" Joint Collaborative Team on Video Coding (JCT-VC) of ITU-T S6 WB3 and ISO/IEC JTC1/SC29/W1; 6th Meeting: Torino, IT; Jul. 14-22, 2011; 4 pages.

Wiegand, T. "Joint Committee Draft" Draft ISO/IEC 14496-10: 2002 ( E ); Joint Video Team (JVTC167) of ISO/IEC MGPG and ITU-T-VCEG; 3rd Meeting; Fairfax, Virginia, USA; May 6-10, 2002; 142 pages.

Guo L et al.: "CABAC Contexts Reduction for Last Position Coding", 8. JCT-VC Meeting; 99, MPEG Meeting; Jan. 2, 2012 Oct. 2, 2012; San Jose; (Joint Collaborative Team on Video Coding of ISO/IEC JTC1/SC29/WG11 and ITU-T SG.16); URL:http://wftp3.itu.int/av-arch/jctvc-site/ No. JCTVC-H)537, Jan. 21, 2012, all pages.

Bross B et al.: "High Efficiency Video Coding (HEVC) text specification draft 6", 99. MPEG Meeting; Jun. 2, 2012-Oct. 2, 2012; San Josa CR; (Motion Picture Expert Group or ISO/IEC JTC1/SC29/WG11) No. m24004, Nov. 21, 2011, all pages.

Patent Cooperation Treaty, International Search Report and Written Opinion of the International Searching Authority for International Application No. PCT/US2013/024654 (CS39888), May 7, 2013, 11 pages.

Nguyen, Tung et al., Entropy coding of syntax elements related to block structures and transform coefficient levels in HEVC, Proceedings of SPIE, vol. 8499, Oct. 25, 2012, section 4 with figures 3-5.

International Search Report and Written Opinion of the International Searching Authority for International Application No. PCT/US2015/060825 dated Feb. 15, 2016, 14 pages.

Bankoski et al. "Technical Overview of VP8, An Open Source Video CODEC for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264:

(56) References Cited

OTHER PUBLICATIONS

Advanced video coding for generic audiovisual services. H.264. International Telecommunication Union. Version 12. Dated Jul. 30, 2010.
Korean Office Action in related matter. KR1020147001166, dated Sep. 15, 2015.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al., "WD3: Working Draft 3 of High-Efficiency Video Coding," Mar 29, 2011 JCTVC-E603, Mar. 29, 2011, all pages.

\* cited by examiner

| 0 | 1 | 2 | X |

*FIG. 6A*

| 3 | 4 | 5 | 6 |    | 7 | 8 | 9 | X |

*FIG. 6B*

| 10 | 11 | 12 | 13 |    | 14 | 15 | 16 | 17 |    | 18 | 18 | 19 | 19 |    | 20 | 20 | 21 | X |

*FIG. 6C*

| 22 | 23 | 24 | 25 |   | 26 | 27 | 28 | 29 |   | 30 | 30 | 31 | 31 |   | 32 | 32 | 33 | 33 |   | 34 | 34 | 34 | 34 |
| 35 | 35 | 35 | 35 |   | 36 | 36 | 36 | 36 |   | 37 | 37 | 37 | X |

*FIG. 6D*

| 0 | 1 | 2 | X |

*FIG. 7A*

| 3 | 4 | 5 | 5 |     | 6 | X | X | X |

*FIG. 7B*

| 7 | 8 | 9 | 9 |     | 10 | 10 | 11 | X |     | X | X | X | X |     | X | X | X | X |

*FIG. 7C*

| 0 | 1 | 2 | 2 |

*FIG. 8A*

| 0 | 0 | 1 | 1 |   | 2 | 2 | X | X |

*FIG. 8B*

| 3 | 3 | 4 | 4 |   | 5 | 5 | 6 | 6 |   | X | X | X | X |   | X | X | X | X |

*FIG. 8C*

| 0 | 1 | 2 | X |

FIG. 9A

| 0 | 0 | 1 | 1 |     | 2 | 2 | X | X |

FIG. 9B

| 3 | 3 | 4 | 4 |   | 5 | 5 | 5 | 5 |   | X | X | X | X |   | X | X | X | X |

FIG. 9C

| 0 | 1 | 2 | X |

*FIG. 10A*

| 0 | 0 | 1 |

| 2 | 2 | X | X |

*FIG. 10B*

| 0 | 0 | 0 | 0 |

| 1 | 1 | 1 | 2 |

| X | X | X | X |

| X | X | X |

*FIG. 10C-1*

| 0 | 0 | 0 | 1 |

| 1 | 1 | 1 | 2 |

| X | X | X | X |

| X | X | X |

DEVICES AND METHODS FOR CONTEXT REDUCTION IN LAST SIGNIFICANT COEFFICIENT POSITION CODING

CROSS-REFERENCE TO RELATED APPLICATIONS

The present application claims the benefit of U.S. provisional patent application No. 61/595,072, filed Feb. 4, 2012, U.S. provisional patent application No. 61/595,138, filed Feb. 5, 2012, and U.S. provisional patent application No. 61/597,033, filed Feb. 9, 2012, which are incorporated herein by reference in their entirety.

FIELD

The disclosure relates generally to the field of video coding, and more specifically to systems, devices and methods for reducing the number of contexts used when coding last transform position.

BACKGROUND

Video compression uses block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in quality loss in reproducing of the original transform block from the source picture.

MPEG-4 AVC, also known as H.264, is an established video compression standard that uses transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (e.g., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is used for pictures coded with progressive video compression techniques and an alternative scan is for pictures coded with interlaced video compression techniques.

HEVC (High Efficiency Video Coding), an international video coding standard developed to succeed H.264, extends transform block sizes to 16×16 and 32×32 pixels to benefit high definition (HD) video coding. HEVC may also use a variety of scan patterns, including zigzag.

Within video compression standards such as HEVC, coding mechanisms for reducing spatial and temporal redundancies are desirable. Ongoing efforts are directed at increasing the efficiencies of encoders and decoders (codecs), which compress and decompress, respectively, video data streams. Because a purpose of codecs is to reduce the size of digital video frames, thereby promoting the efficient storage and communication of video, development in codec hardware and encoding/decoding processes continues.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

FIGS. 6A-6D are diagrams showing example conventional context models;

FIGS. 7A-7C are diagrams showing example conventional context models;

FIGS. 8A-8C are diagrams showing example context models according to embodiments of the disclosure;

FIGS. 9A-9C are diagrams showing example context models according to embodiments of the disclosure;

FIGS. 10A, 10B, 10C-1, and 10C-2 are diagrams showing example context models according to embodiments of the disclosure;

FIG. 12 is an example L0 significance map for a 16×16 TU having at least one sub-block with a non-zero coefficient according to embodiments of the disclosure;

FIG. 13 is an example corresponding L1 significance map for the example L0 significance map of FIG. 12.

BRIEF SUMMARY

Figure 1A:
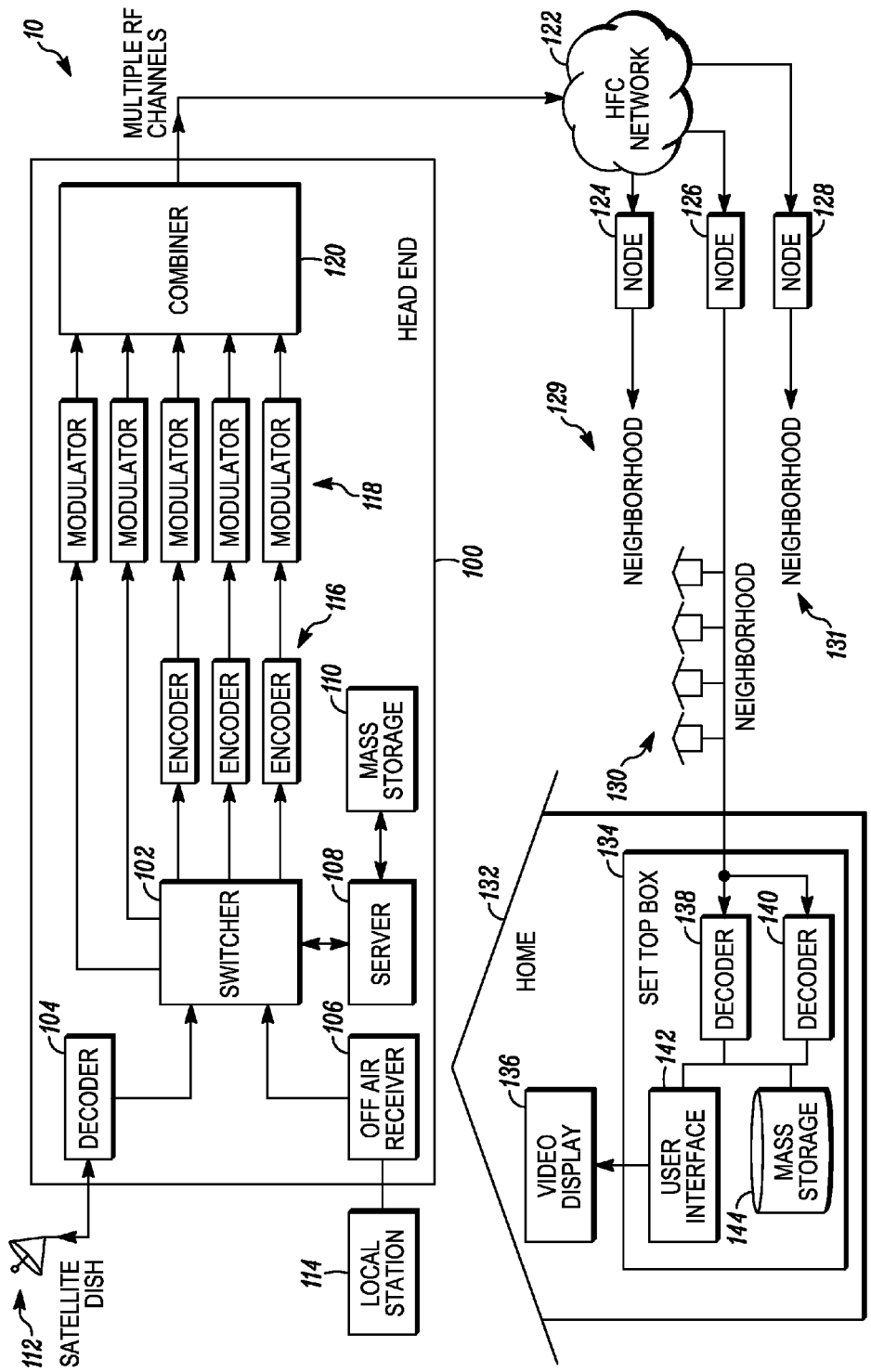
FIG. 1A is a video system in which the various embodiments of the disclosure may be used.

Accordingly, there are provided herein systems and methods that improve video compression efficiencies by reducing the number of contexts used when coding last transform position. The methods and systems described herein generally pertain to video processing such as video encoders and decoders.

In a first aspect, a method of video encoding is provided, the method comprising: encoding a position of a last non-zero coefficient within a video block having a first width, wherein the position of the last non-zero coefficient is provided as a string of binary values, wherein each binary value in said string corresponds to a bin index value; and determining a context index value for each bin index value, wherein the context index value for each bin index value is configured to be shared across two or more blocks of different widths. In an embodiment of the first aspect, the context index value is derived from the bin index value according to the equation: context index=bin index>>(log$_2$ (TU$_{size}$)−2), where >> indicates a shift operation and TU$_{size}$ refers to width of the video block. In an embodiment of the first aspect, the context index value is derived from the bin index value using a lookup table. In an embodiment of the first aspect, the lookup table includes a context model having three context index values for a block width of 8. In an embodiment of the first aspect, loss in coding efficiency associated with using three context index values is less than 1%. In an embodiment of the first aspect, the lookup table includes a context model having three context index values for a block width of 16. In an embodiment of the first aspect, loss in coding efficiency associated with using three context index values is less than 1%. In an embodiment of the first aspect, the lookup table includes a context model having six context index values for a block width of 16. In an embodiment of the first aspect, loss in coding efficiency associated with using six context index values is less than 1%. In an embodiment of the first aspect, the lookup table includes a context model having seven context index values for a block width of 16. In an embodiment of the first aspect, loss in coding efficiency associated with using seven context index values is less than 1%. In an embodiment of the first aspect, the context index values include: a size associated with the block; a position of a given one of the coefficients within the block according to the scanning order; and the scanning order. In an embodiment of the first aspect, encoding the position of the last non-zero coefficient is achieved via entropy encoding. In an embodiment of the first aspect, the entropy encoding comprises context adaptive binary arithmetic coding (CABAC). In an embodiment of the first aspect, CABAC includes truncated codewords for a position of the last non-zero coefficient. In an embodiment of the first aspect, encoding the position of the last non-zero coefficient comprises explicitly encoding the position of the last non-zero coefficient by signaling its X and Y coordinates independently. In an embodiment of the first aspect, the position of the last non-zero coefficient is encoded prior to encoding positions of other non-zero coefficients. In an embodiment of the first aspect, the entropy encoding comprises high efficiency video coding (HEVC). In an embodiment of the first aspect, encoding comprises decoding, and wherein decoding identifies the position of the last non-zero coefficient within the video block. In an embodiment of the first aspect, the method is implemented on a computer having a processor and a memory coupled to said processor, wherein at least some of steps are performed using said processor.

In a second aspect, an apparatus for encoding video is provided, the apparatus comprising a video coder configured to: encode a position of a last non-zero coefficient within a video block having a first width, wherein the position of the last non-zero coefficient is provided as a string of binary values, wherein each binary value in said string corresponds to a bin index value; and determine a context index value for each bin index value, wherein the context index value for each bin index value is configured to be shared across two or more blocks of different widths. In an embodiment of the second aspect, the context index value is derived from the bin index value according to the equation: context index=bin index>>(log$_2$(TU$_{size}$)−2), where >> indicates a shift operation and TU$_{size}$ refers to width of the video block. In an embodiment of the second aspect, the context index value is derived from the bin index value using a lookup table. In an embodiment of the second aspect, the lookup table includes a context model having three context index values for a block width of 8. In an embodiment of the second aspect, loss in coding efficiency associated with using three context index values is less than 1%. In an embodiment of the second aspect, the lookup table includes a context model having three context index values for a block width of 16. In an embodiment of the second aspect, loss in coding efficiency associated with using three context index values is less than 1%. In an embodiment of the second aspect, the lookup table includes a context model having six context index values for a block width of 16. In an embodiment of the second aspect, loss in coding efficiency associated with using six context index values is less than 1%. In an embodiment of the second aspect, the lookup table includes a context model having seven context index values for a block width of 16. In an embodiment of the second aspect, loss in coding efficiency associated with using seven context index values is less than 1%. In an embodiment of the second aspect, the context index values include: a size associated with the block; a position of a given one of the coefficients within the block according to the scanning order; and the scanning order. In an embodiment of the second aspect, encoding the position of the last non-zero coefficient is achieved via entropy encoding. In an embodiment of the second aspect, the entropy encoding comprises context adaptive binary arithmetic coding (CABAC). In an embodiment of the second aspect, CABAC includes truncated codewords for a position of the last non-zero coefficient. In an embodiment of the second aspect, encoding the position of the last non-zero coefficient comprises explicitly encoding the position of the last non-zero coefficient by signaling its X and Y coordinates independently. In an embodiment of the second aspect, wherein the position of the last non-zero coefficient is encoded prior to encoding positions of other non-zero coefficients. In an embodiment of the second aspect, the entropy encoding comprises high efficiency video coding (HEVC). In an embodiment of the second aspect, the video encoder comprises a video decoder configured to decode a position of a last non-zero coefficient within a video block. In an embodiment of the second aspect, the apparatus comprises at least one of: an integrated circuit; a microprocessor; and a wireless communication device that includes the video decoder. In an embodiment of the second aspect, the apparatus comprises at least one of: an integrated circuit; a microprocessor; and a wireless communication device that includes the video encoder.

DETAILED DESCRIPTION

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of image and/or video data consistent with this disclosure. Image and video data generally consist of three components—one for a luma component which represents brightness of a pixel and two for chroma components which represent color information of a pixel.

The present discussion begins with a very brief overview of some terms and techniques known in the art of digital image compression. This overview is not meant to teach the known art in any detail. Those skilled in the art know how to find greater details in textbooks and in the relevant standards.

An example of a video system in which an embodiment of the disclosure may be used will now be described. It is understood that elements depicted as function blocks in the figures may be implemented as hardware, software, or a combination thereof. Furthermore, embodiments of the disclosure may also be employed on other systems, such as on a personal computer, smartphone or tablet computer.

Referring to FIG. 1A, a video system, generally labeled 10, may include a head end 100 of a cable television network. The head end 100 may be configured to deliver video content to neighborhoods 129, 130 and 131. The head end 100 may operate within a hierarchy of head ends, with the head ends higher in the hierarchy generally having greater functionality. The head end 100 may be communicatively linked to a satellite dish 112 and receive video signals for non-local programming from it. The head end 100 may also be communicatively linked to a local station 114 that delivers local programming to the head end 100. The head end 100 may include a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 may also be communicatively linked to a hybrid fiber cable (HFC) network 122. The HFC network 122 may be communicatively linked to a plurality of nodes 124, 126, and 128. Each of the nodes 124, 126, and 128 may be linked by coaxial cable to one of the neighborhoods 129, 130 and 131 and deliver cable television signals to that neighborhood. One of the neighborhoods 130 of FIG. 1A is shown in more detail. The neighborhood 130 may include a number of residences, including a home 132 shown in FIG. 1A. Within the home 132 may be a set-top box 134 communicatively linked to a video display 136. The set-top box 134 may include a first decoder 138 and a second decoder 140. The first and second decoders 138 and 140 may be communicatively linked to a user interface 142 and a mass storage device 144. The user interface 142 may be communicatively linked to the video display 136.

During operation, head end 100 may receive local and nonlocal programming video signals from the satellite dish 112 and the local station 114. The nonlocal programming video signals may be received in the form of a digital video stream, while the local programming video signals may be received as an analog video stream. In some embodiments, local programming may also be received as a digital video stream. The digital video stream may be decoded by the decoder 104 and sent to the switcher 102 in response to customer requests. The head end 100 may also include a server 108 communicatively linked to a mass storage device 110. The mass storage device 110 may store various types of video content, including video on demand (VOD), which the server 108 may retrieve and provide to the switcher 102. The switcher 102 may route local programming directly to the modulators 118, which modulate the local programming, and route the non-local programming (including any VOD) to the encoders 116. The encoders 116 may digitally encode the non-local programming. The encoded non-local programming may then be transmitted to the modulators 118. The combiner 120 may be configured to receive the modulated analog video data and the modulated digital video data, combine the video data and transmit it via multiple radio frequency (RF) channels to the HFC network 122.

The HFC network 122 may transmit the combined video data to the nodes 124, 126 and 128, which may retransmit the data to their respective neighborhoods 129, 130 and 131. The home 132 may receive this video data at the set-top box 134, more specifically at the first decoder 138 and the second decoder 140. The first and second decoders 138 and 140 may decode the digital portion of the video data and provide the decoded data to the user interface 142, which then may provide the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code may be executed on a computer system by a processor, such as an application-specific integrated circuit (ASIC), or other type of circuit. For example, computer code for implementing the encoders 116 may be executed on a computer system (such as a server) residing in the head end 100. Computer code for the decoders 138 and 140, on the other hand, may be executed on the set-top box 134, which constitutes a type of computer system. The code may exist as software programs comprised of program instructions in source code, object code, executable code or other formats. It should be appreciated that the computer code for the various components shown in FIG. 1A may reside anywhere in system 10 or elsewhere (such as in a cloud network), that is determined to be desirable or advantageous. Furthermore, the computer code may be located in one or more components, provided the instructions may be effectively performed by the one or more components.

Figure 1B:
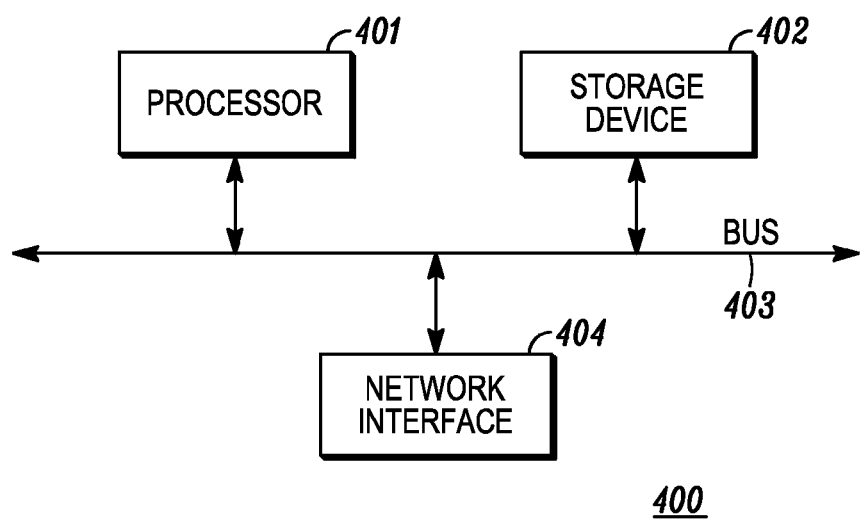
FIG. 1B is a computer system on which embodiments of the disclosure may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 may be communicated over a communication bus 403, for example. Computer system 400 may also include a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the head end 100 and execute the encoders 116, and may also be embodied in the set-top box 134 to execute the decoders 138 and 140. Additionally, the computer system 400 may reside in places other than the head end 100 and the set-top box 134, and may be miniaturized so as to be integrated into a smartphone or tablet computer.

Video encoding systems may achieve compression by removing redundancy in the video data, e.g., by removing those elements that can be discarded without greatly adversely affecting reproduction fidelity. Because video signals take place in time and space, most video encoding systems exploit both temporal and spatial redundancy present in these signals. Typically, there is high temporal correlation between successive frames. This is also true in the spatial domain for pixels which are close to each other. Thus, high compression gains are achieved by carefully exploiting these spatio-temporal correlations.

Figure 2A:
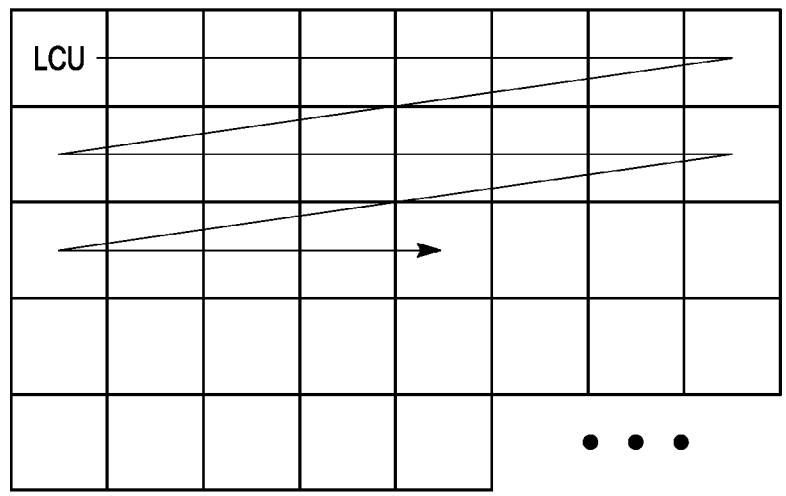
FIGS. 2A, 2B, 3A and 3B illustrate certain video encoding principles according to embodiments of the disclosure.
Figure 3A:
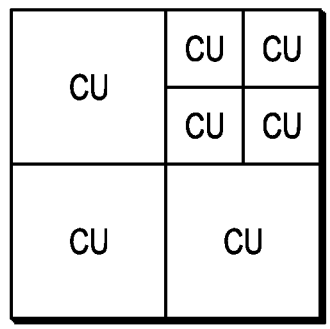

A high-level description of how video data gets encoded and decoded by the encoders 116 and the decoders 138 and 140 in an embodiment of the disclosure will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units) or CTBs (coding tree blocks), as shown in FIG. 2A. Unlike other video coding standards, in which the basic coding unit is a macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs. In general, for HEVC, the smallest CU used (e.g., a leaf node as described in further detail below) is considered a CU.

Figure 3B:
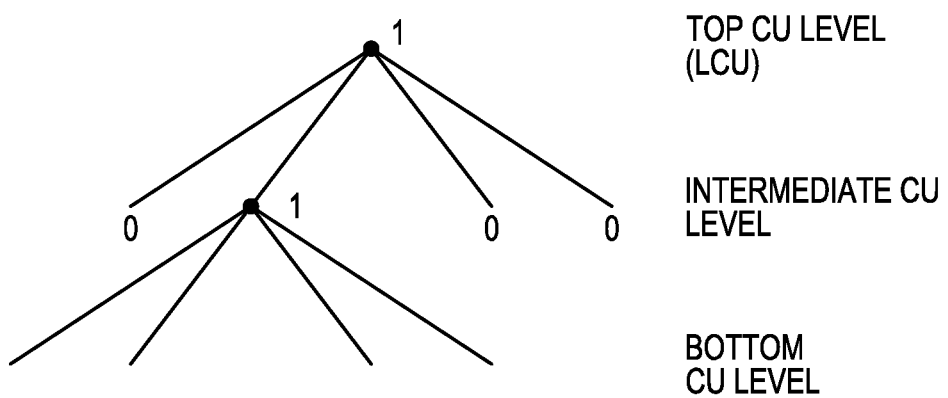

How a particular LCU is split into CUs can be represented by a quadtree. At each node of the quadtree, a flag is set to "1" if the node is further split into sub-nodes. Otherwise, the flag is unset at "0." For example, the LCU partition of FIG. 3A can be represented by the quadtree of FIG. 3B. These "split flags" may be jointly coded with other flags in the video bitstream, including a skip mode flag, a merge mode flag, and a predictive unit (PU) mode flag, and the like. In the case of the quadtree of FIG. 3B, the split flags 10100 could be coded as overhead along with the other flags. Syntax information for a given CU may be defined recursively, and may depend on whether the CU is split into sub-CUs.

Figure 2B:
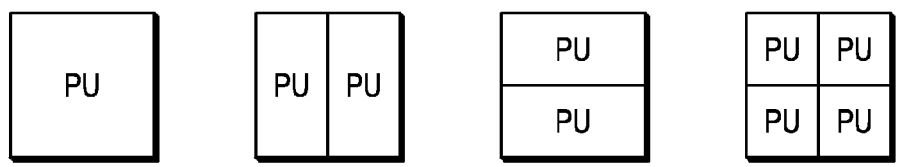

A node that is not split (e.g., a node corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. Thus, at each leaf of a quadtree, a CU of 2N×2N can possess one of four possible patterns (N×N, N×2N, 2N×N and 2N×2N), as shown in FIG. 2B. While shown for a 2N×2N CU, other PUs having different dimensions and corresponding patterns (e.g., square or rectangular) may be used. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s). The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Additionally, a motion vector predictor index may be used to identify a motion vector predictor (e.g., MV of left neighbor, MV of co-located neighbor). Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

In general, in intra-prediction encoding, a high level of spatial correlation is present between neighboring blocks in a frame. Consequently, a block can be predicted from the nearby encoded and reconstructed blocks, giving rise to the intra prediction. In some embodiments, the prediction can be formed by a weighted average of the previously encoded samples, located above and to the left of the current block. The encoder may select the mode that minimizes the difference or cost between the original and the prediction and signals this selection in the control data.

In general, in inter-prediction encoding, video sequences have high temporal correlation between frames, enabling a block in the current frame to be accurately described by a region (or two regions in the case of bi-prediction) in the previously coded frames, which are known as reference frames. Inter-prediction utilizes previously encoded and reconstructed reference frames to develop a prediction using a block-based motion estimation and compensation technique.

Following intra-predictive or inter-predictive encoding to produce predictive data and residual data, and following any transforms (such as the 4×4 or 8×8 integer transform used in H.264/AVC or a discrete cosine transform (DCT)) to produce transform coefficients, quantization of transform coefficients may be performed. In some embodiments, any transform operations may be bypassed using, e.g., a transform skip mode in HEVC. Quantization generally refers to a process in which transform coefficients are quantized to possibly reduce the amount of data used to represent the coefficients, e.g., by converting high precision transform coefficients into a finite number of possible values. These steps will be discussed in more detail below.

Figure 5A:
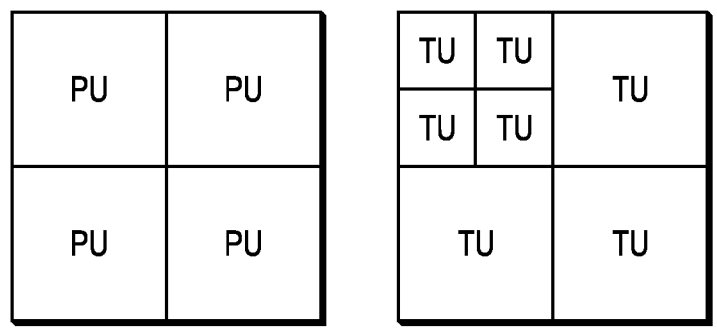
FIGS. 5A and 5B illustrate further video coding principles according to an embodiments of the disclosure.
Figure 5B:
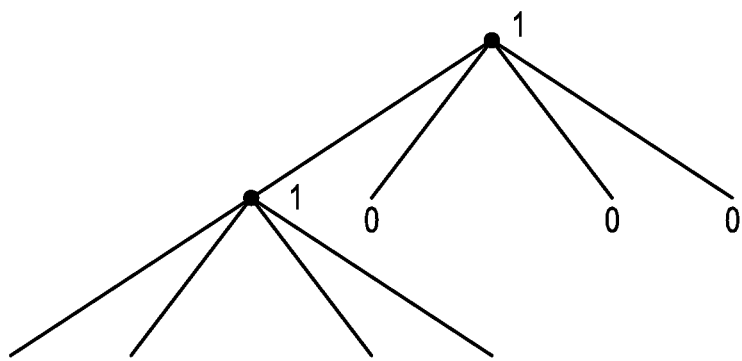

Each CU can also be divided into transform units (TUs). In some embodiments, a block transform operation is performed on one or more TUs, to decorrelate the pixels within the block and compact the block energy into the low order coefficients of the transform block. In some embodiments, one transform of 8×8 or 4×4 may be applied. In other embodiments, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead. As is appreciated, CUs, PUs, and TUs may be of N×N in size or M×N (or N×M), where N≠M.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized. In video encoding, quantization is the step that introduces loss, so that a balance between bitrate and reconstruction quality can be established. These steps will be discussed further below.

Block partitioning serves an important purpose in block-based video coding techniques. Using smaller blocks to code video data may result in better prediction of the data for locations of a video frame that include high levels of detail, and may therefore reduce the resulting error (e.g., deviation of the prediction data from source video data), represented as residual data. In general, prediction exploits the spatial or temporal redundancy in a video sequence by modeling the correlation between sample blocks of various dimensions, such that only a small difference between the actual and the predicted signal needs to be encoded. A prediction for the current block is created from the samples which have already been encoded. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (e.g., sub-blocks) may be considered video blocks. In addition, a slice may be considered to be a plurality of video blocks (e.g., macroblocks, or coding units), and/or sub-blocks (partitions of macroblocks, or sub-coding units such as sub-blocks of PUs, TUs, etc.). Each slice may be an independently decodable unit of a video frame. Alternatively, frames themselves may be decodable units, or other portions of a frame may be defined as decodable units. Furthermore, a GOP, also referred to as a group of pictures, may be defined as a decodable unit.

Figure 4A:
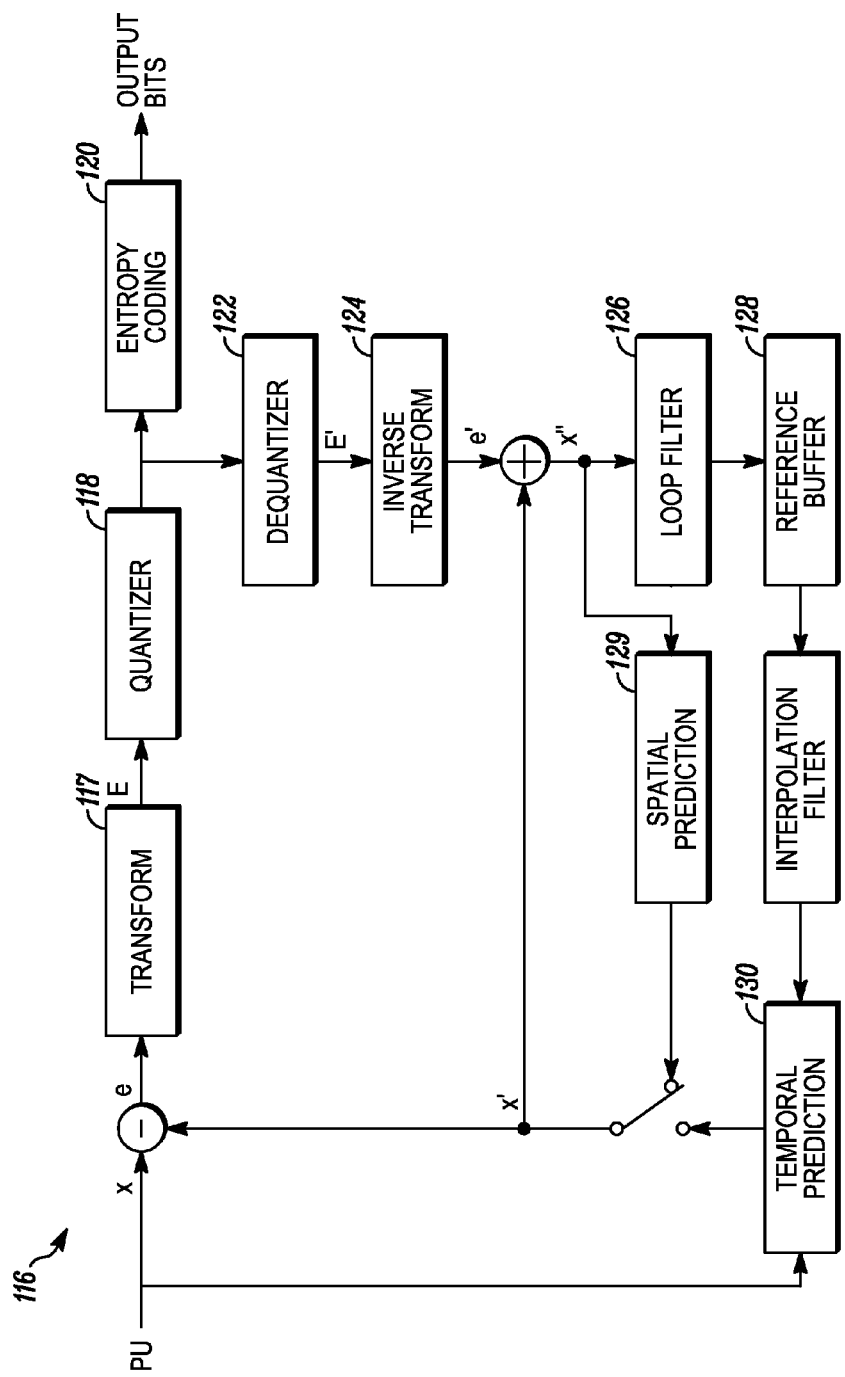
FIGS. 4A and 4B show possible architectures for an encoder and a decoder according to embodiments of the disclosure.

The encoders 116 (FIG. 1A) may be, according to an embodiment of the disclosure, composed of several functional modules as shown in FIG. 4A. These modules may be implemented as hardware, software, or any combination of the two. Given a current PU, x, a prediction PU, x', may first be obtained through either spatial prediction or temporal prediction. This spatial or temporal prediction may be performed by a spatial prediction module 129 or a temporal prediction module 130 respectively.

There are several possible spatial prediction directions that the spatial prediction module 129 can perform per PU, including horizontal, vertical, 45-degree diagonal, 135-degree diagonal, DC, Planar, etc. In general, spatial prediction may be performed differently for luma PU and chroma PU. For example, including the Luma intra modes, an additional mode, called IntraFromLuma, may be used for the Chroma intra prediction mode. A syntax indicates the spatial prediction direction per PU.

The encoder 116 (FIG. 1A) may perform temporal prediction through motion estimation operation. Specifically, the temporal prediction module 130 (FIG. 4A) may search for a best match prediction for the current PU over reference pictures. The best match prediction may be described by motion vector (MV) and associated reference picture (refIdx). Generally, a PU in B pictures can have up to two MVs. Both MV and refIdx may be part of the syntax in the bitstream.

The prediction PU may then be subtracted from the current PU, resulting in the residual PU, e. The residual CU, generated by grouping the residual PU, e, associated with the CU, may then be transformed by a transform module 117, one transform unit (TU) at a time, resulting in the residual PU in the transform domain, represented by transform coefficients E. To accomplish this task, the transform module 117 may use, e.g., either a square or a non-square block transform.

Referring back to FIG. 4A, the transform coefficients E may then be quantized by a quantizer module 118, converting the high precision transform coefficients into a finite number of possible values. The quantization process may reduce the bit depth associated with some or all of the coefficients. For example, an n-bit value may be rounded down to an m-bit value during quantization, where n is greater than m. In some embodiments, external boundary conditions are used to produce modified one or more transform coefficients. For example, a lower range or value may be used in determining if a transform coefficient is given a nonzero value or just zeroed out. As should be appreciated, quantization is a lossy operation and the loss by quantization generally cannot be recovered.

The quantized coefficients may then be entropy coded by an entropy coding module 120, resulting in the final compression bits. The specific steps performed by the entropy coding module 120 will be discussed below in more detail. It should be noted that the prediction, transform, and quantization described above may be performed for any block of video data, e.g., to a PU and/or TU of a CU, or to a macroblock, depending on the specified coding standard.

To facilitate temporal and spatial prediction, the encoder 116 may also take the quantized transform coefficients E and dequantize them with a dequantizer module 122 resulting in the dequantized transform coefficients E'. The dequantized transform coefficients are then inverse transformed by an inverse transform module 124, resulting in the reconstructed residual PU, e'. The reconstructed residual PU, e', is then added to the corresponding prediction, x', either spatial or temporal, to form a reconstructed PU, x".

Referring still to FIG. 4A, a deblocking filter (DBF) operation may be performed on the reconstructed PU, x", first to reduce blocking artifacts. A sample adaptive offset (SAO) process may be conditionally performed after the completion of the deblocking filter process for the decoded picture, which compensates the pixel value offset between reconstructed pixels and original pixels. In some embodiments, both the DBF operation and SAO process are implemented by adaptive loop filter functions, which may be performed conditionally by a loop filter module 126 over the reconstructed PU. In some embodiments, the adaptive loop filter functions minimize the coding distortion between the input and output pictures. In some embodiments, loop filter module 126 operates during an inter-picture prediction loop. If the reconstructed pictures are reference pictures, they may be stored in a reference buffer 128 for future temporal prediction.

HEVC specifies two loop filters that are applied in order with the de-blocking filter (DBF) applied first and the sample adaptive offset (SAO) filter applied afterwards. The DBF is similar to the one used by H.264/MPEG-4 AVC but with a simpler design and better support for parallel processing. In HEVC the DBF only applies to an 8×8 sample grid while with H.264/MPEG-4 AVC the DBF applies to a 4×4 sample grid. DBF uses an 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter process is applied after the DBF and is made to allow for better reconstruction of the original signal amplitudes by using e.g., a look up table that includes some parameters that are based on a histogram analysis made by the encoder. The SAO filter has two basic types which are the edge offset (EO) type and the band offset (BO) type. One of the SAO types can be applied per coding tree block (CTB). The edge offset (EO) type has four sub-types corresponding to processing along four possible directions (e.g., horizontal, vertical, 135 degree, and 45 degree). For a given EO sub-type, the edge offset (EO) processing operates by comparing the value of a pixel to two of its neighbors using one of four different gradient patterns. An offset is applied to pixels in each of the four gradient patterns. For pixel values that are not in one of the gradient patterns, no offset is applied. The band offset (BO) processing is based directly on the sample amplitude which is split into 32 bands. An offset is applied to pixels in 16 of the 32 bands, where a group of 16 bands corresponds to a BO sub-type. The SAO filter process was designed to reduce distortion compared to the original signal by adding an offset to sample values. It can increase edge sharpness and reduce ringing and impulse artifacts.

In an embodiment of the disclosure, intra pictures (such as an I picture) and inter pictures (such as P pictures or B pictures) are supported by the encoder 116 (FIG. 1A). An intra picture may be coded without referring to other pictures. Hence, spatial prediction may be used for a CU/PU inside an intra picture. An intra picture provides a possible point where decoding can begin. On the other hand, an inter picture generally aims for high compression. Inter picture supports both intra and inter prediction. A CU/PU in inter picture is either spatially or temporally predictive coded. Temporal references are the previously coded intra or inter pictures.

The operation of the entropy coding module 120 (FIG. 4A) according to an embodiment will now be described in more detail. The entropy encoding of the block of quantized transform domain coefficients may be based upon one or more context models. For example, entropy coding module 120 takes the quantized matrix of coefficients received from the quantizer module 118 and uses it to generate a sign matrix that represents the signs of all of the quantized coefficients and to generate a significance map. A significance map may be a matrix in which each element specifies the position(s) of the non-zero quantized coefficient(s) within the quantized coefficient matrix. Specifically, given a quantized 2D transformed matrix, if the value of a quantized coefficient at a position (x,y) is non-zero, it may be considered as significant and a "1" is assigned for the position (x,y) in the associated significance map. Otherwise, a "0" is assigned to the position (x,y) in the significance map. One or more context models are required for entropy encoding of different coding information.

In some entropy encoding standards, context processing within the entropy encoder section is performed with the position of the last significant coefficient encoded before the position of the other significant coefficients. The position of the last coefficient may be encoded explicitly by signaling its X and Y coordinates with a unary code (e.g., 0 or 1). The X and Y coordinate signaling may be independent, as well as luminance and the chrominance signaling.

In some embodiments, the CABAC coding of the last significant coefficient is modified. For example, codeword structures may be used to represent the location of the last significant coefficient. For example, Table 1 shows an exemplary table on how codeword structures may be used to locate or identify the last component in a TU of size 8×8. The magnitude of the last position component refers to the location of the last component for each X and Y directions. It should be appreciated that the position along the X coordinate or direction is a position along the width (horizontal) of the block, while a position along the Y coordinate is a position along the height (vertical) of the block. Thus, for the TU of size 8×8, there are 8 positions for each direction X, Y ranging from 0-7.

TABLE 1

| Binarization for TU 8 × 8 | | | |
|---|---|---|---|
| Magnitude of last position component | Truncated unary (context model) | Fixed binary (bypass) | f_value |
| 0 | 0 | — | — |
| 1 | 10 | — | — |
| 2 | 110 | — | — |
| 3 | 1110 | — | — |
| 4-5 | 11110 | X | 0-1 |
| 6-7 | 11111 | X | 0-1 |

The truncated unary (context model) may also be referred to as the prefix or prefix code. The fixed binary (bypass) may also be referred to as the suffix or suffix code. The truncated unary values describe the context model. As used herein, "context model" is used in a CABAC engine to code binary symbols. A context model describes the probability of a coding symbol to be "1" instead of "0". As used herein, "bin index" indicates the location of each bin within a prefix code. Each of the bins is coded by the CABAC engine with an assigned context model. It should be appreciated that for any given TU, non-zero values are usually (e.g., based on probability) located in the first half or upper left quadrants of the TU. Consequently, the last significant coefficient will also likely be located in this region (e.g., in positions 0-3 for both X and Y). Thus, in some embodiments, using truncated or shorter codewords for the most likely positions saves bits and storage/processing time.

Still referring to Table 1, as can be seen, the shortest codewords are assigned to the most likely locations for non-zero values or coefficients. In some embodiments, another way to shorten or truncate the codewords is to assign a prefix and suffix for later (and more unlikely locations for) non-zero values. The f_value designates the suffix value, e.g., 0 or 1. For the shortest codewords (e.g., locations 0-3), only a prefix is assigned. For longer codewords (e.g., locations 4-8), a prefix and suffix may be assigned. For example, for a coefficient of position (4,5), the codeword transmitted will be 111100 111101. As another example, for a coefficient of position (4, 6), the codeword transmitted will be 111100 111110. Thus, it can be seen that depending on the value (e.g., (4 or 5) or (6 or 7)) that the prefix remains the same, but a different suffix is tacked on to differentiate the values grouped together (e.g., (4 and 5) or (6 and 7)).

Tables 2, 3 and 4 represent how codeword structures may be used to locate or identify the last component in a TU of size 4×4, 16×16 and 32×32, respectively.

TABLE 2

Binarization for TU 4 × 4

| Magnitude of last position component | Truncated unary (context model) | Fixed binary (bypass) | f_value |
|---|---|---|---|
| 0 | 0 | — | — |
| 1 | 10 | — | — |
| 2 | 110 | — | — |
| 3 | 111 | — | — |

TABLE 3

Binarization for TU 16 × 16

| Magnitude of last position component | Truncated unary (context model) | Fixed binary (bypass) | f_value |
|---|---|---|---|
| 0 | 0 | — | — |
| 1 | 10 | — | — |
| 2 | 110 | — | — |
| 3 | 1110 | — | — |
| 4-5 | 11110 | X | 0-1 |
| 6-7 | 111110 | X | 0-1 |
| 8-11 | 1111110 | XX | 0-3 |
| 12-15 | 1111111 | XX | 0-3 |

TABLE 4

Binarization for TU 32 × 32

| Magnitude of last position component | Truncated unary (context model) | Fixed binary (bypass) | f_value |
|---|---|---|---|
| 0 | 1 | — | — |
| 1 | 10 | — | — |
| 2 | 110 | — | — |
| 3 | 1110 | — | — |
| 4-5 | 11110 | X | 0-1 |
| 6-7 | 111110 | X | 0-1 |
| 8-11 | 1111110 | XX | 0-3 |
| 12-15 | 11111110 | XX | 0-3 |
| 16-23 | 111111110 | XXX | 0-7 |
| 24-31 | 111111111 | XXX | 0-7 |

FIGS. 6A through 6D depict a model showing contexts (e.g., bin indexing) that have minimal overlap or sharing of bins. By way of example, contexts are only shown for the X coordinate, with contexts being separately but similarly utilized for the Y coordinate. This example shows the sharing of selected contexts, indicated by use of the same context number in select consecutive bins. For example, in FIG. 6C, contexts 18 and 19 are shared among multiple bins, while in FIG. 6D, contexts 30, 31, 32, 33, 34, 35, 36 and 37 are additionally shared among multiple bins. Bins that have an X in them identify bins that do not require a new context.

The number of context models shown in the model of FIG. 6 include 3 context models for a 4×4 TU (FIG. 6A), 7 context models for an 8×8 TU (FIG. 6B), 12 context models for a 16×16 TU (FIG. 6C) and 16 context models for a 32×32 TU (FIG. 6D). Assuming that the context models show the X coordinate for luminance (Luma) coding, this example requires a total of 3+7+12+16=38 contexts. For chrominance (Chroma) coding, the largest block width is 16, so using this example, it requires 3+7+12=22 contexts. In some embodiments, context models for luma components are different from those for chroma components.

FIGS. 7A through 7C depict a model showing contexts that have an increased amount of overlap or sharing of bins (or reduction of contexts). This example shows the sharing of selected contexts, indicated by use of the same context number in select consecutive bins. For example, in FIG. 7B, context 5 is shared among multiple bins, while in FIG. 7C, contexts 9 and 10 are shared among multiple bins. In general, FIG. 7 illustrates a context assignment table to code the last position of a chroma component, as up to block sizes or widths of 16 are provided.

The number of context models shown in the model of FIG. 7 include 3 context models for a 4×4 TU (FIG. 7A), 4 context models for an 8×8 TU (FIG. 7B), and 5 context models for a 16×16 TU (FIG. 7C). Assuming that the context models show the X coordinate for chrominance (Chroma) coding, the largest block width is 16, so using this example, it requires 3+4+5=12 contexts.

As described thus far, Tables 1-4 show specific prefix (truncated unary mode) and suffix (bypass mode) combinations for each possible magnitude of a last position component. Each bin index in the prefix code is assigned a particular context model as shown in FIGS. 6-10. It should be appreciated that the bin index 0 corresponds to the most significant bit (left most bit) of the prefix code. For example, for a codeword "2" from Table 3 (binarization for TU 16×16) with 3 bins designated as "110", the value of bin index "0" is "1", the value of bin index "1" is "1", and the value of bin index 3 is "0".

In some embodiments, the total number of contexts used for last significance coefficient coding may be even further reduced for e.g., one or more of luma and chroma TUs. In some embodiments, the number of contexts may be reduced by assigning the same contexts to a few consecutive bins of X or Y per TU size. For example, the first and the second bins of X or Y for a TU size may be assigned a same context, as described above with reference to FIGS. 6 and 7. The context reduction can also be achieved by assigning the same contexts to certain bins of X or Y for different TU sizes. These certain bins may be in relatively similar significant bit positions of X or Y for different TU sizes. For example, the first bin of X or Y in 4×4 TU and 8×8 TU may use a same context. FIGS. 8, 9 and 10 depict addition models showing contexts that have an increased amount of overlap or sharing of bins (or reduction of contexts). Further discussion of bin sharing and context reduction may be found in U.S. patent application Ser. No. 13/745,660, entitled "Devices and Methods for Context Reduction in Last Significant Coefficient Position Coding," filed on Jan. 18, 2013, and incorporated by reference herein in its entirety.

In FIG. 8, 3 same contexts are used for both 4×4 TU (FIG. 8A) and 8×8 TU (FIG. 8B), and 4 different contexts are used for 16×16 TU (FIG. 8C), thereby reducing the total number of contexts from 12 (e.g., as shown in the model of FIG. 7) to 7 for chrominance coding.

In FIG. 9, 3 same contexts are used for both 4×4 TU (FIG. 9A) and 8×8 TU (FIG. 9B), and 3 different contexts are used for 16×16 TU (FIG. 9C), thereby reducing the total number of contexts from 12 (e.g., as shown in the model of FIG. 7) to 6 for chrominance coding.

In FIG. 10, 3 same contexts are used for the 4×4 TU (FIG. 10A), 8×8 TU (FIG. 10B) and 16×16 (FIG. 10C-1 or FIG. 10C-2) TU, thereby reducing the total number of contexts from 12 (e.g., as shown in the model of FIG. 7) to 3 for chrominance coding.

Thus, from the teachings of FIGS. 8-10, the context assignment for each bin indexing may be compared to see the efficiencies or reduction of contexts, as shown in Tables 5, 6 and 7, where Table 5 shows the context assignment for each bin indexing of FIG. 8, Table 6 shows the context assignment for each bin indexing of FIG. 9, and Table 7 shows the context assignment for each bin indexing of FIG. 10. The maximum length of the bins on the last position component is shown in Table 8 and illustrates the differences between FIGS. 7-10.

TABLE 5

Bin index for context index assignment of FIG. 8

| Bin index | 0 | 1 | 2 | 3 | 4 | 5 | 6 | 7 |
|---|---|---|---|---|---|---|---|---|
| TU 4 × 4- Context index | 0 | 1 | 2 | X | | | | |
| TU 8 × 8- Context index | 0 | 0 | 1 | 1 | 2 | X | X | X |
| TU 16 × 16- Context index | 3 | 3 | 4 | 4 | 5 | 5 | 6 | X |

TABLE 6

Bin index for context index assignment of FIG. 9

| Bin index | 0 | 1 | 2 | 3 | 4 | 5 | 6 | 7 |
|---|---|---|---|---|---|---|---|---|
| TU 4 × 4- Context index | 0 | 1 | 2 | X | | | | |
| TU 8 × 8- Context index | 0 | 0 | 1 | 1 | 2 | X | X | X |
| TU 16 × 16- Context index | 3 | 3 | 4 | 4 | 5 | 5 | 5 | X |

TABLE 7

Bin index for context index assignment of FIG. 10

| Bin index | 0 | 1 | 2 | 3 | 4 | 5 | 6 | 7 |
|---|---|---|---|---|---|---|---|---|
| TU 4 × 4- Context index | 0 | 1 | 2 | X | | | | |
| TU 8 × 8- Context index | 0 | 0 | 1 | 1 | 2 | X | X | X |
| TU 16 × 16- Context index | 0 | 0 | 0 | 0* | 1 | 1 | 1** | X |

*as shown in FIG. 10C-1. This would be a 1 for FIG. 10C-2.
**as shown in FIG. 10C-1. This would be a 2 for FIG. 10C-2.

TABLE 8

The maximum length of the bins on the last position component

| | FIG. 7 context model | FIG. 8 context model | FIG. 9 context model | FIG. 10 context model |
|---|---|---|---|---|
| TU 4 × 4 | 3 | 3 (shared) | 3 (shared) | 3 (shared) |
| TU 8 × 8 | 4 | 3 (shared) | 3 (shared) | 3 (shared) |
| TU 16 × 16 | 5 | 4 | 3 | 3 (shared) |
| Total non-shared contexts | 12 | 7 | 6 | 3 |

From reviewing Tables 5-8, it can be appreciated that the number of contexts used to code the last significant coefficient may be reduced by reusing or sharing the same context at the similar frequency position across TU sizes. Using this technique, it may be assumed that the distribution of quantized coefficients is scalable across different TU (e.g., their statistics are similar).

Referring now to Tables 9 and 10, simulation results using the context assignment models of FIG. 9 (6 total contexts) and FIG. 10 (3 total contexts) are shown in Tables 9 and 10, respectively. From Tables 9 and 10, experimental results illustrating rate distortion is highlighted. For example, average loss in luma and chroma components are less than 0.0% and 0.7% in the experiment with 6 contexts, respectively. Similarly, average loss in luma and chroma components are less than 0.0% and 0.6% in the experiment with 3 contexts, respectively. As used herein, average loss of x % refers to loss in coding efficiency, meaning that the reduced context model requires x % additional bits to achieve similar reconstruction quality as that of the anchor, or video compressed by HEVC reference software. From Tables 9 and 10, it can be seen that loss in coding efficiency associated with using reduced context models (e.g., having 6 or 7 contexts) is usually less than about 0.5%, and more generally less than about 1%.

TABLE 9

Simulation results for context index assignment having 6 contexts

| | All Intra HE | | | All Intra LC | | |
|---|---|---|---|---|---|---|
| | Y | U | V | Y | U | V |
| Class A (8 bit) | 0.1% | 0.0% | 0.3% | 0.0% | 0.1% | 0.1% |
| Class B | 0.0% | 0.1% | 0.3% | 0.0% | 0.1% | 0.1% |
| Class C | 0.0% | 0.0% | 0.0% | 0.0% | 0.0% | 0.0% |
| Class D | 0.0% | 0.1% | 0.1% | 0.0% | 0.0% | 0.0% |
| Class E | 0.0% | 0.1% | 0.0% | 0.0% | 0.1% | 0.1% |
| Overall | 0.0% | 0.1% | 0.1% | 0.0% | 0.1% | 0.1% |
| | 0.0% | 0.1% | 0.2% | 0.0% | 0.1% | 0.1% |
| Class F | 0.0% | 0.0% | 0.1% | 0.1% | 0.1% | 0.1% |

| | Random Access HE | | | Random Access LC | | | Random Access HE-10 | | |
|---|---|---|---|---|---|---|---|---|---|
| | Y | U | V | Y | U | V | Y | U | V |
| Class A (8 bit) | 0.0% | −0.1% | 0.1% | 0.0% | 0.2% | 0.0% | 0.0% | 0.4% | 1.1% |
| Class B | 0.0% | 0.2% | 0.3% | 0.0% | 0.1% | 0.1% | 0.0% | 0.2% | 0.3% |
| Class C | 0.0% | 0.0% | 0.1% | 0.0% | 0.2% | 0.0% | | | |
| Class D | 0.0% | −0.1% | 0.3% | 0.0% | 0.5% | −0.1% | | | |
| Class E | | | | | | | | | |

TABLE 9-continued

Simulation results for context index assignment having 6 contexts

| Overall | 0.0% | 0.0% | 0.2% | 0.0% | 0.2% | 0.0% | 0.0% | 0.3% | 0.7% |
|---|---|---|---|---|---|---|---|---|---|
|  | 0.0% | 0.0% | 0.2% | 0.0% | 0.2% | 0.0% | 0.0% | 0.3% | 0.6% |
| Class F | −0.1% | 0.1% | 0.0% | 0.0% | 0.1% | 0.0% |  |  |  |

|  | Low delay B HE | | | Low delay B LC | | |
|---|---|---|---|---|---|---|
|  | Y | U | V | Y | U | V |
| Class A |  |  |  |  |  |  |
| Class B | 0.0% | 0.5% | 0.7% | 0.0% | 0.3% | 0.4% |
| Class C | 0.0% | 0.1% | 0.2% | 0.0% | 0.2% | 0.1% |
| Class D | 0.0% | 0.0% | 0.0% | 0.0% | 0.9% | 0.2% |
| Class E | 0.1% | 0.0% | 0.1% | 0.0% | −2.3% | −0.2% |
| Overall | 0.0% | 0.2% | 0.3% | 0.0% | −0.1% | 0.2% |
|  | 0.0% | 0.2% | 0.2% | 0.0% | −0.1% | 0.1% |
| Class F | −0.1% | 0.1% | 0.1% | 0.1% | 0.1% | −0.6% |

TABLE 10

Simulation results for context index assignment having 3 contexts

|  | All Intra HE | | | All Intra LC | | |
|---|---|---|---|---|---|---|
|  | Y | U | V | Y | U | V |
| Class A (8 bit) | 0.0% | 0.0% | 0.2% | 0.1% | 0.1% | 0.1% |
| Class B | 0.0% | 0.2% | 0.3% | 0.1% | 0.2% | 0.2% |
| Class C | 0.0% | 0.0% | 0.1% | 0.0% | 0.1% | 0.1% |
| Class D | 0.0% | 0.2% | 0.1% | 0.0% | 0.0% | 0.0% |
| Class E | 0.0% | 0.2% | 0.1% | 0.0% | 0.1% | 0.1% |
| Overall | 0.0% | 0.1% | 0.2% | 0.0% | 0.1% | 0.1% |
|  | 0.0% | 0.1% | 0.2% | 0.0% | 0.1% | 0.1% |
| Class F | 0.0% | 0.0% | 0.1% | 0.1% | 0.1% | 0.1% |

|  | Random Access HE | | | Random Access LC | | | Random Access HE-10 | | |
|---|---|---|---|---|---|---|---|---|---|
|  | Y | U | V | Y | U | V | Y | U | V |
| Class A (8 bit) | 0.0% | 0.0% | −0.3% | 0.1% | 0.2% | −0.1% | 0.0% | 0.6% | 0.6% |
| Class B | 0.0% | 0.3% | 0.3% | 0.0% | 0.3% | 0.2% | 0.0% | 0.3% | 0.5% |
| Class C | 0.0% | 0.1% | 0.1% | 0.0% | 0.2% | 0.1% |  |  |  |
| Class D | 0.0% | −0.1% | 0.1% | 0.0% | 0.5% | −0.1% |  |  |  |
| Class E |  |  |  |  |  |  |  |  |  |
| Overall | 0.0% | 0.1% | 0.1% | 0.0% | 0.3% | 0.1% | 0.0% | 0.4% | 0.5% |
|  | 0.0% | 0.1% | 0.1% | 0.0% | 0.3% | 0.0% | 0.0% | 0.4% | 0.6% |
| Class F | −0.1% | −0.1% | 0.1% | 0.0% | 0.0% | 0.0% |  |  |  |

|  | Low delay B HE | | | Low delay B LC | | |
|---|---|---|---|---|---|---|
|  | Y | U | V | Y | U | V |
| Class A |  |  |  |  |  |  |
| Class B | 0.0% | 0.7% | 0.6% | 0.0% | 0.2% | 0.4% |
| Class C | 0.0% | 0.0% | 0.3% | 0.0% | 0.4% | 0.3% |
| Class D | 0.0% | −0.1% | −0.1% | 0.0% | 0.7% | 0.4% |
| Class E | 0.0% | −0.2% | −0.2% | 0.0% | −0.1% | −0.2% |
| Overall | 0.0% | 0.1% | 0.2% | 0.0% | 0.3% | 0.2% |
|  | 0.0% | 0.2% | 0.2% | 0.0% | 0.2% | 0.2% |
| Class F | −0.1% | 0.1% | −0.2% | −0.1% | −0.4% | −0.2% |

As shown in Tables 9 and 10, Classes A, B, C, D, E and F refer to group of test video sequences and are generally related to picture resolution size. For example, Class A has a resolution size of 2560×1600 pixels, Class B has a resolution size of 1920×1080 pixels, Class E has a resolution size of 1280×720 pixels, Class C has a resolution of 832×480 pixels, and Class D has a resolution of 416×240 pixels. Class F varies in resolution size from 832×480 pixels to 1024×768 pixels to 1280×720 pixels, all with different frames/rate.

Y, U and V refer to one luma component and two chroma components, respectively. All Intra HE/LC, Random Access HE/LC/HE-10, and Low Delay B HE/LC refer to different settings (e.g., picture type combinations, Intra, P-"Low Delay" and B-"Random Access") to measure the efficiency. For example, Random Access HE-10 condition may utilize advanced coding tools such as adaptive loop filter, may increase internal bit depth over bit depth of input video and may allow PU in certain B pictures to use reference in both backward (e.g., preceding in display order) and forward (e.g., behind in display order) directions. Low Delay B LC condition may disable some high complexity coding tools such as SAO, may allow PU to use reference in backward direction and may allow up to 2 MVs per PU.

As can be appreciated, Tables 5-8 show that given a bin index value, a context index value may be retrieved or looked up and selected from the appropriate table (e.g., based in TU size or width). While using a reduced number of contexts saves memory, the tables that map the context index values to bin index values consume some memory.

Consequently, in some embodiments, methods for deriving context index values from bin index values may provide for further memory savings and faster operations. An example equation that may be used to derive or determine context index values from bin index values is provided below in Eqn. 1:

$$\text{context index} = \text{bin index} \gg (\log_2(TU_{size})-2) \qquad \text{Eqn. 1}$$

where $\gg$ indicates a shift operation and $TU_{size}$ refers to the size or width of the transform unit (e.g., 4, 8, 16, 32, etc.). In the example below, shifting of 0 bit is used for TU size 4×4 and hence value of bin index is identical to context index.

Using Eqn. 1, the following may be determined for a 4×4 TU:
if bin index=0, then context index=0
if bin index=1, then context index=1
if bin index=2, then context index=2

Using Eqn. 1, the following may be determined for a 8×8 TU:
if bin index=0, then context index=0
if bin index=1, then context index=0
if bin index=2, then context index=1
if bin index=3, then context index=1
if bin index=4, then context index=2

Using Eqn. 1, the following may be determined for a 16×16 TU:
if bin index=0, then context index=0
if bin index=1, then context index=0
if bin index=2, then context index=0
if bin index=3, then context index=0
if bin index=4, then context index=1
if bin index=5, then context index=1
if bin index=6, then context index=1

Once the entropy coding module 120 has created the significance map, it may code the significance map. In one embodiment, this is accomplished by using a context-based adaptive binary arithmetic coding (CABAC) technique. In doing so, the entropy coding module 120 scans the significance map along a scanning line and, for each entry in the significance map, the coding module chooses a context model for that entry. The entropy coding module 120 then codes the entry based on the chosen context model. That is, each entry is assigned a probability based on the context model (the mathematical probability model) being used. The probabilities are accumulated until the entire significance map has been encoded.

Figure 11:
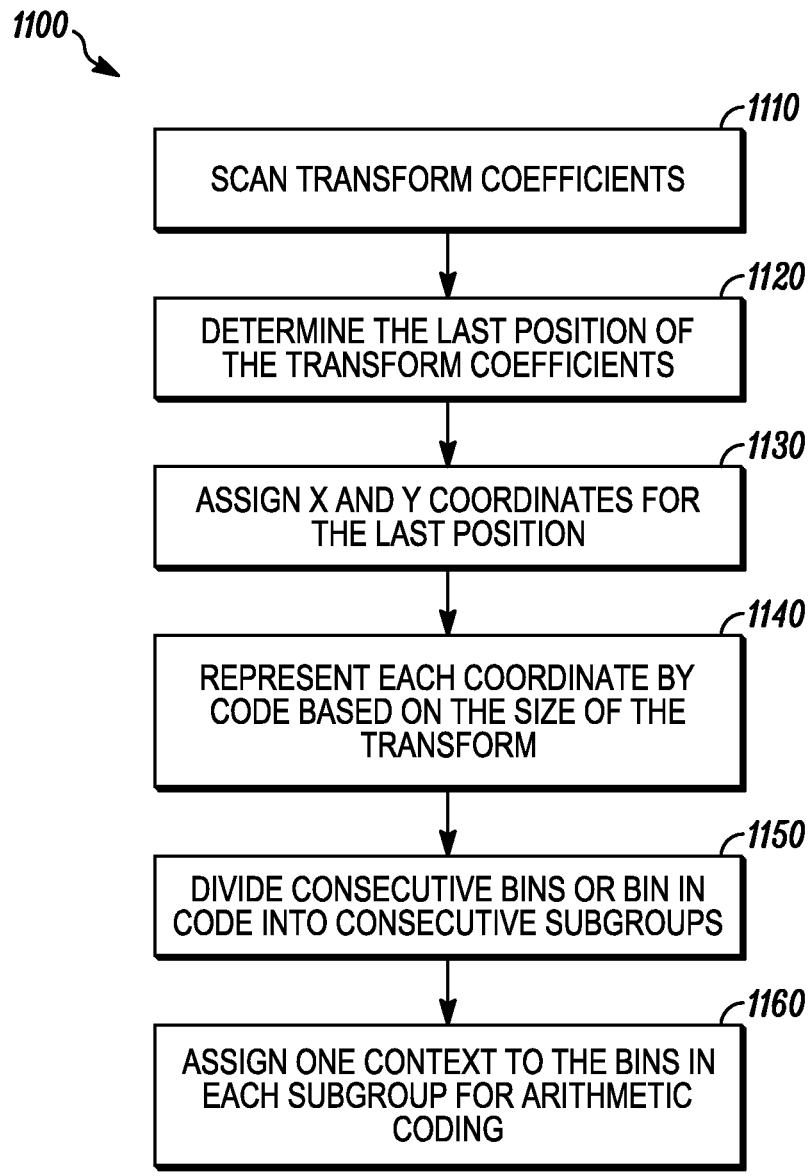
FIG. 11 is a flow diagram of context reduced last significant coefficient position coding according to embodiments of the disclosure.

FIG. 11 illustrates an example embodiment of a context-reduced last significant coefficient transform coding process 1100. At block 1110, a scan transform coefficients (e.g., in a 2D matrix) is performed (e.g., according to a 1D order such as X or Y direction). At block 1120, the position of the last significant transform coefficient is determined (e.g., according to the 1D order). At block 1130, X and Y coordinates are assigned to the last significant coefficient position determined in block 1120. Each coordinate may then be mathematically represented, such as by unary coding (e.g., truncated), binary coding, etc., or its combination at block 1140 (e.g., based on the size of the 2D transform). At block 1150, consecutive bins may be divided in the appropriate code (e.g., unary, binary, etc.) into consecutive sub groups. Finally, at block 1160, assignment of one context to the bins in each subgroup is made for arithmetic coding, where bins are shared in response to bin width.

Stated another way, given a TU, the position of the last significant coefficient is first represented by its coordinate (x,y) within the TU, where x refers to a horizontal coordinate and y refers to a vertical coordinate. In some embodiments, both x and y coordinates need to be coded. In order to do this, each coordinate is converted into a sequence of binary bins, which are e.g., CABAC, coded. For CABAC coding, each bin is assigned a context. In some embodiments, context assignment for a bin is based upon the bin's significant positions in the sequence of bins (e.g., the left bin is the most significant bin and the right is lowest significant bin). As described herein, bins with a same significant position in TU of different sizes may share a same context.

The value output by the entropy coding module 120 as well as the entropy encoded signs, significance map and non-zero coefficients may be inserted into the bitstream by the encoder 116 (FIG. 1A). This bitstream may be sent to the decoders 138 and 140 over the HFC network 122.

In some embodiments, two-level significance map coding for a TU may be used: level zero (L0) and level one (L1). As explained above, the significance map of a TU indicates the positions of non-zero coefficients in the TU. The two-level structure of significance maps first divides a large TU (e.g., of sizes 16×16 and 32×32) into non-overlapping sub-blocks of same size (e.g., 4×4).

In some embodiments, L1 significant map indicates which 4×4 sub-blocks within a TU contain at least one non-zero coefficient. For example, if a 4×4 sub-block has at least one nonzero coefficient, a syntax flag or indicator for the sub-block is set to 1, otherwise it is set 0.

In some embodiments, L0 significance map indicates which coefficients within a TU are nonzero coefficients. For example, if a coefficient is a non-zero coefficient, a syntax flag or indicator for the coefficient is set to 1; otherwise, it is set to 0.

Figures 12, 13:
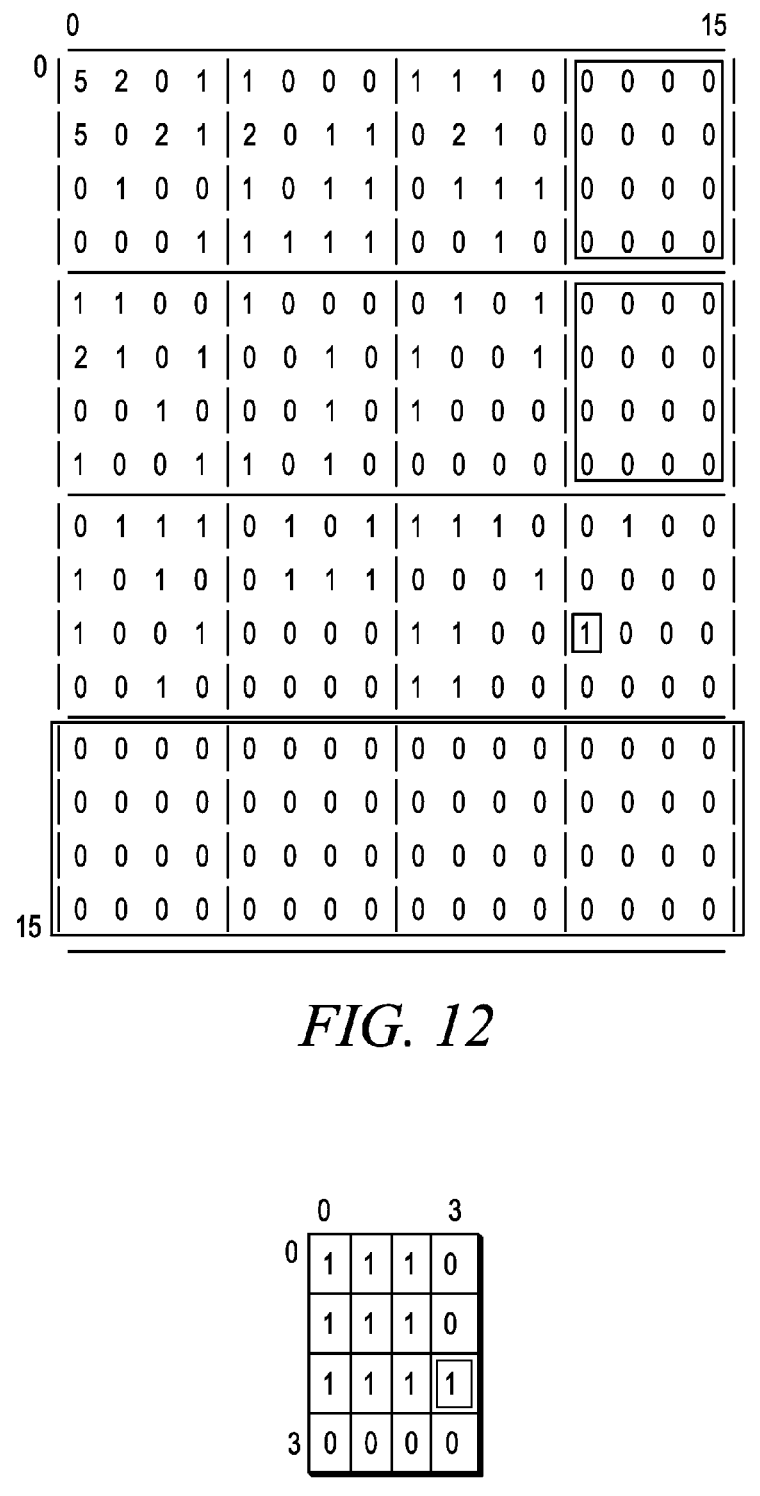

FIG. 12 shows an example for a L0 significance map for a 16×16 TU having at least one sub-block with a non-zero coefficient. The last significant coefficient is highlighted by having a box surrounding it, and its position syntax is 12 (X-coordinate) and 10 (Y-coordinate). As shown, the 16×16 TU is divided into 16 4×4 sub-blocks. The 4×4 sub-blocks that contain only zero coefficients are highlighted by having surrounding boxes or borders. These boxed-in sub-blocks have the syntax flag set to 0, in accordance with the present disclosure. The balance of 4×4 sub-blocks contains at least one nonzero coefficient, and therefore their syntax flags are set to 1.

For the example of FIG. 12, the corresponding L1 significance map is shown in FIG. 13, where 1 is assigned to 4×4 sub-blocks with at least one non-zero coefficient and 0 is assigned to 4×4 sub-blocks with only zero coefficients. The sub-block that is highlighted by having a box surrounding it is the last coded sub-block. Similar to the last coded coefficient position of FIG. 11, a syntax position or flag for the last coded sub-block position, may be used. For example, in FIG. 12, the horizontal position (X-coordinate) from the left to the boxed-in sub-block, in sub-block units, has the value 3. The vertical position (Y-coordinate) from the top to the boxed-in sub-block, in sub-block units, has the value 2. As shown in FIG. 12, the range of the last coded sub-block position is reduced to 0-3 comparing the range of last coded coefficient position of 0-16 for the 16×16 TU.

With the introduction of a multi-level significance map structure, the last coded sub-block position may be coded in addition to or instead of the last coded coefficient position for an M×N TU. In some embodiments, a two-level significance map structure may be applied to TU of size 16×16, 16×4, 4×16, 32×32, 32×8 and 8×32. It should be appreciated that this list is exemplary only, and that other size TUs may be used the two-level significance map structure coding.

In some embodiments, benefits associated with coding the last-coded sub-block may include a reduction in the range of last coded position. For example, if a TU is divided into 4×4 sub-blocks, the range is reduced from 0-15 to 0-3 for 16×N or N×16 TU, and from 0-31 to 0-7 for 32×N or N×32 TU, where N is equal to, or smaller less than, the other dimension size. Another benefit may include a reduction in the context table size for coding the syntax of the last coded position. Specifically, referring back to Table 8, instead of up to 7 luma contexts (e.g., for the context model of FIG. 8) for 16×16 and 7 luma contexts for 32×32 of each type (I, P, B), only half that size of contexts (e.g., 3), or even smaller than half the size of contexts are required for coding of the last sub-block position.

Also, in some embodiments, the contexts for 4×4 and 8×8 TU may be used to code the last coded sub-block position of 16×16 and 32×32 TUs. In such instances, the 16×16 and 32×32 contexts may be completely removed. For example, if using last-group position coding, the same context assignment for a 4×4 TU can be used for a 16×16 TU (e.g., examples in FIGS. 12 and 13). Similarly, the same context assignment for an 8×8 TU can be used for a 32×32 TU.

In some embodiments, For M×N TU where M≠N and max(M,N)≥16, the same benefits in context reduction as described above for square matrices may be possible.

As described above, there can be many TUs of different sizes for a picture (e.g., 4×4, 8×8, and 16×16). Each TU with at least one non-zero quantized coefficient has a last significant coefficient, defined along with a coding scanning pattern, as is known by one of skill in the art. In some embodiments, the position (x,y) of the significant coefficient of a TU is coded. Thereafter, each component of the position (x,y) is converted into a sequence or string of bins, with the sequence or string of bins being coded using e.g., CABAC. Each bin may be CABAC coded with a specific context (e.g., each bin is assigned a context index). For example, a first context may be assigned to the first significant bin(s) of the sequence of bins, a second context may be assigned to the second significant bin(s) of the sequence of bins, and a third context may be assigned to the third significant bin(s) of the significant bins. In some embodiments, the first context is 0, the second context is 1, and the third context is 2.

In some embodiments, the first significant bin(s) may include the first significant bin for 4×4 TU, the first and second significant bins for 8×8 TU, and the first, second, third and fourth most significant bins for 16×16 TU. The second significant bin(s) may include the second significant bins for 4×4 TU, the third and fourth significant bins for 8×8 TU, and the fifth, sixth and seventh significant bins for 16×16 TU. The third significant bin(s) may include the third significant bin for 4×4 TU and the fifth significant bin for 8×8 TU.

In some embodiments, a specific context index may be assigned to more than one bin in a string of bins. In some embodiments, a specific context index may be assigned to more than one bin in a string of bins.

In some embodiments, the first context may be assigned to the first significant bins of the sequence of bins of the last significant coefficients of TUs of different sizes. The second context may be assigned to the second significant bins of the sequence of bins of the last significant coefficients of TUs of different sizes. The third context may be assigned to the third significant bins of the sequence of bins of the last significant coefficients of TUs of different sizes.

Figure 14:
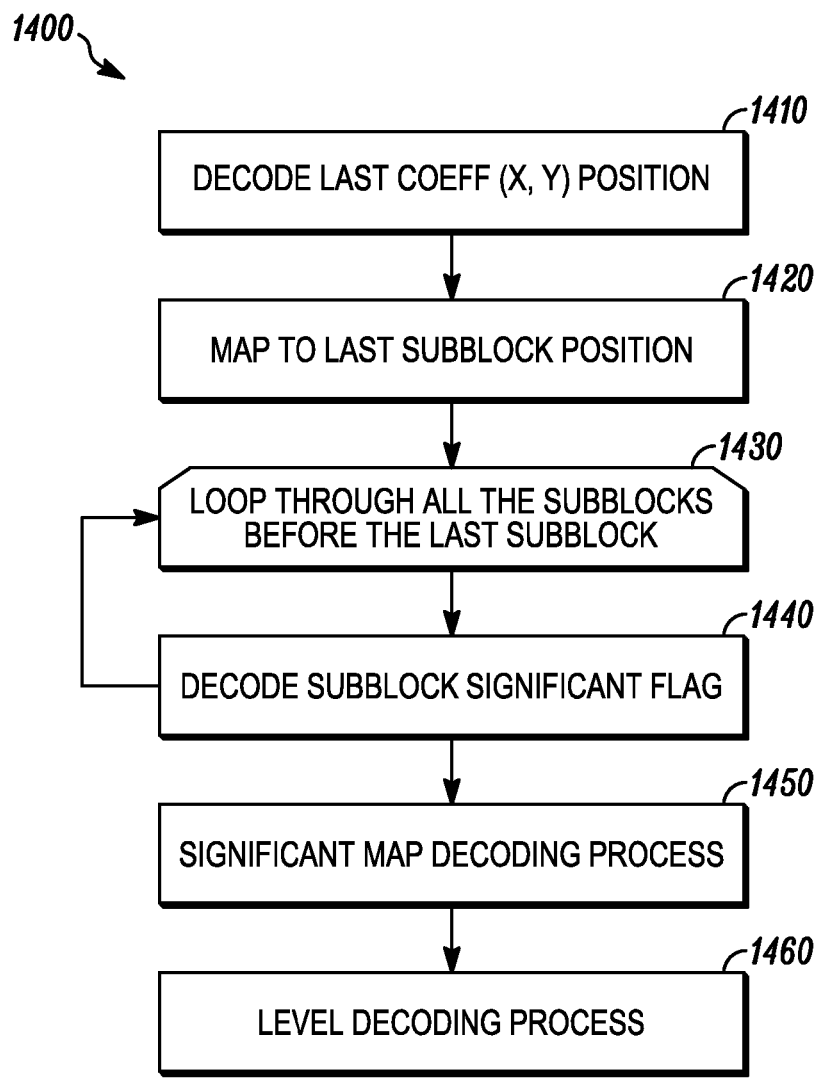
FIG. 14 is an example flow diagram of a general decoding process for M×N transform unit (TU) which uses last significant coefficient coding according to embodiments of the disclosure.
Figure 15:
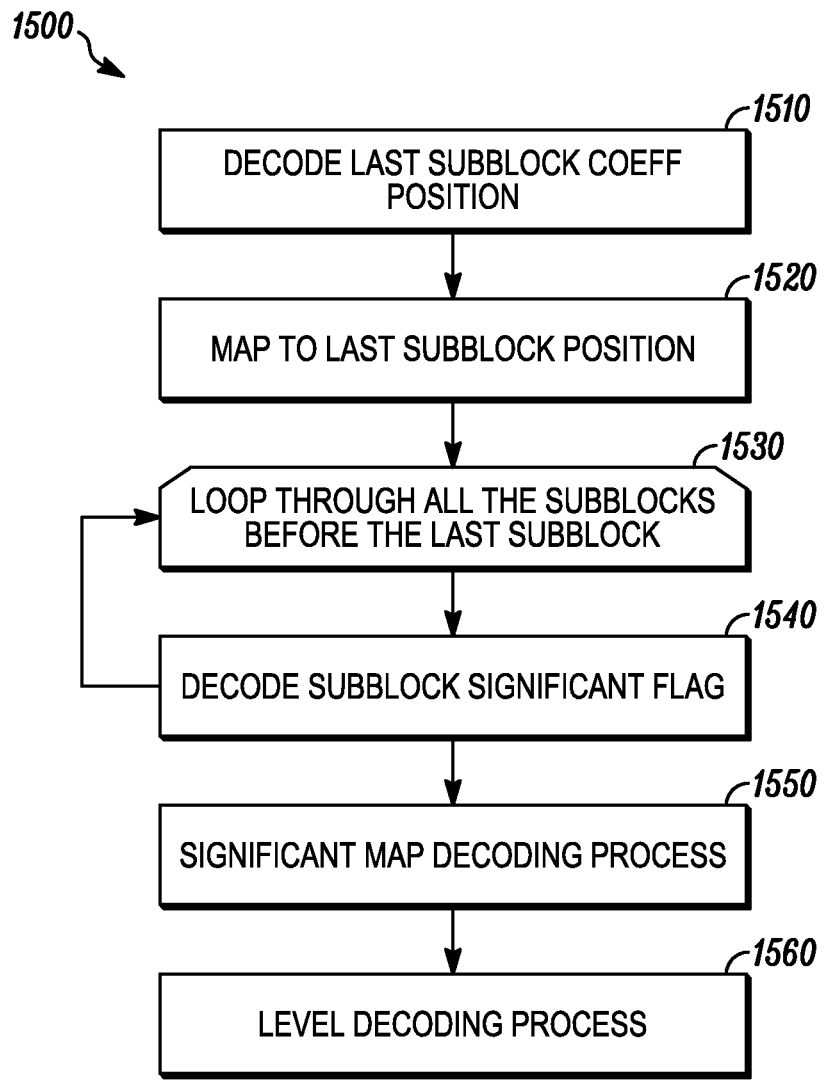
FIG. 15 is an example flow diagram of a general decoding process for M×N transform unit (TU) which uses last sub-block position coding according to embodiments of the disclosure.

As described above, the last coefficient coding process may code the position of last nonzero transform coefficient of a TU with respect to a pre-determining scan pattern/coding order, so the decoder can skip consecutive number of zero coefficients at the end of TU. FIGS. 14 and 15 show example flow charts of decoding processes for an M×N TU in accordance with the principles of the present disclosure.

In FIG. 14, the flow chart of a general decoding process 1400 for M×N transform unit (TU) is shown which uses last significant coefficient coding. At block 1410, the last significant coefficient position is decoded (e.g., the X-coordinate and Y-coordinate are determined). At block 1420, the last significant coefficient position is mapped to a last sub-block position. In other words, as described in 2-level significance mapping, the last sub-block where a last significant coefficient is found may be identified. At block 1430, all of the sub-blocks before the last sub-block position are scanned or looped through. At block 1440, the last sub-block may be decoded. Thereafter, at block 1450, the significant map decoding process may occur. At block 1460, the decoding process may then be leveled to preserve the values or magnitudes for the significant coefficients. Additionally, in some embodiments, the sign(s) for the magnitudes may also be provided or transmitted In FIG. 15, the flow chart of a general decoding process for M×N transform unit (TU) is shown which uses last sub-block position coding. At block 1510, the sub-block where the last significant coefficient position is located is decoded (e.g., the X-coordinate and Y-coordinate are determined). At block 1520, the sub-block where the last significant coefficient position is located is mapped to a last sub-block position. At block 1530, all of the sub-blocks before the last sub-block position are scanned or looped through. At block 1540, the last sub-block may be decoded. Thereafter, at block 1550, the significant map decoding process may occur. At block 1560, the decoding process may then be leveled to preserve the values or magnitudes for the significant coefficients. Additionally, in some embodiments, the sign(s) for the magnitudes may also be provided or transmitted.

In some embodiments, using last sub-block position coding simplifies entropy coding of TU block in two ways. First, the overhead to signal higher level significance maps is reduced in half. Second, logic and context table size required for higher level significance maps are further reduced.

Figure 4B:
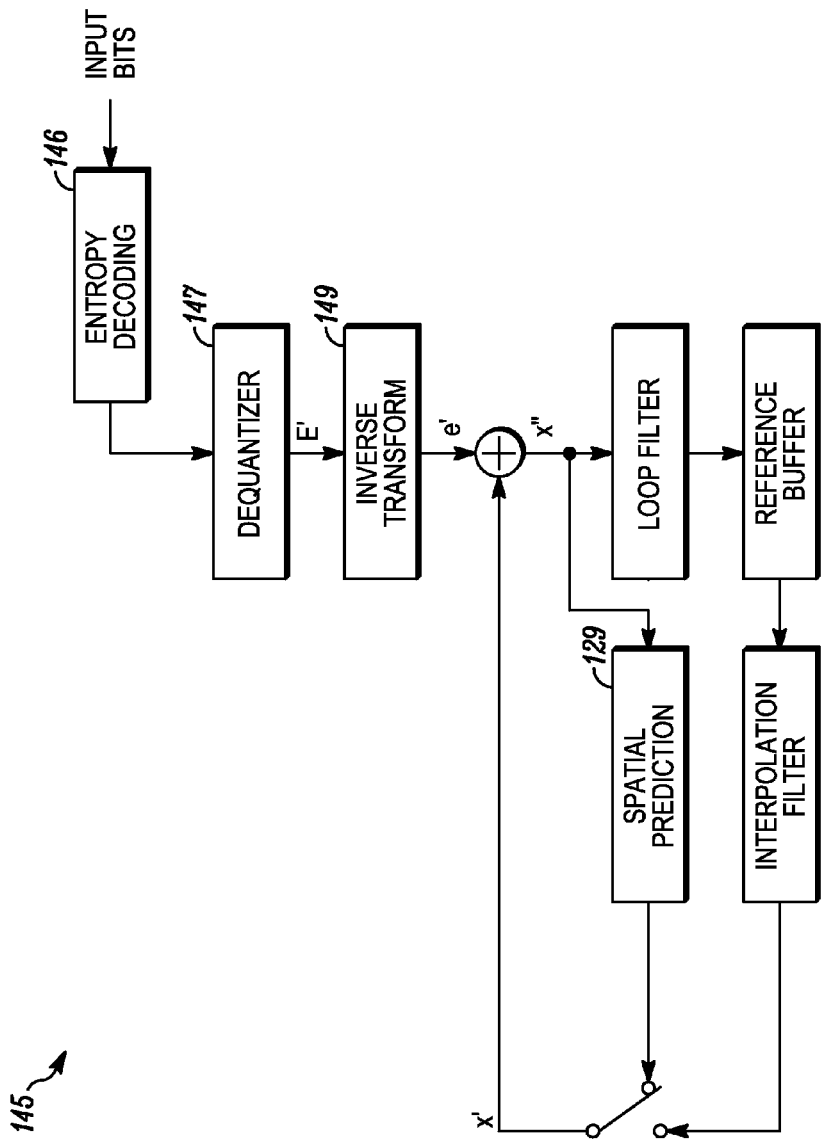

When the decoders 138 and 140 (FIG. 1A) receive the bitstream, they perform the functions shown in e.g., FIG. 4B. An entropy decoding module 146 of the decoder 145 may decode the sign values, significance map and non-zero coefficients to recreate the quantized and transformed coefficients. In decoding the significance map, the entropy decoding module 146 may perform the reverse of the procedure described in conjunction with the entropy coding module 120—decoding the significance map along a scanning pattern made up of scanning lines. The entropy decoding module 146 then may provide the coefficients to a dequantizer module 147, which dequantizes the matrix of coefficients, resulting in E'. The dequantizer module 147 may provide the dequantized coefficients to an inverse transform module 149. The inverse transform module 149 may perform an inverse transform operation on the coefficients resulting in e'. Filtering and spatial prediction may be applied in a manner described in conjunction with FIG. 4A.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method of video encoding, the method comprising:
   determining, a position of a last non-zero coefficient within each of a first video block having a first width, a second video block having a second width different from the first width and a third video block having a third width different from the first width and the second width;
   determining a context index value for each bin index value for video blocks having at least the first width, the second width and the third width;
   encoding, using a processor coupled to memory, the position of the last non-zero coefficient within each of the first video block, the second video block and the third video block as a string of binary values, wherein each binary value in said string corresponds to a bin index value encoded using a respective context index value, and wherein:
      each of at least three context index values is shared across each the first video block and the second video block, but not across the third video block, and a last context index value for the third video block is different from each of the first video block and the second video block; and
   encoding at least one of the first video block, the second video block and the third video block using two-level significance map coding by:
      dividing the at least one of the first video block, the second video block and the third video block into same-size two or more non-overlapping sub-blocks;
      generating a respective significance map for each sub-block; and
   generating a level-1 significance map, wherein each sub-block corresponds to a position in the level-1 significance map and the position is set to 1 if the sub-block has at least one non-zero value, otherwise the position is set to 0.

2. The method of claim 1, wherein the context index value is derived from the bin index value according to the equation:

context index value=bin index value>>($\log_2$(TU$_{size}$)−2);

where >> indicates a shift operation and TU$_{size}$ refers to width of the video block.

3. The method of claim 1, wherein the context index value is derived from the bin index value using a lookup table.

4. The method of claim 3, wherein the lookup table includes a context model having three context index values for a block width of 8.

5. The method of claim 4, wherein loss in coding efficiency associated with using three context index values is less than 1%.

6. The method of claim 3, wherein the lookup table includes a context model having three context index values for a block width of 16.

7. The method of claim 6, wherein loss in coding efficiency associated with using three context index values is less than 1%.

8. The method of claim 3, wherein the lookup table includes a context model having six context index values for a block width of 16.

9. The method of claim 8, wherein loss in coding efficiency associated with using six context index values is less than 1%.

10. The method of claim 3, wherein the lookup table includes a context model having seven context index values for a block width of 16.

11. The method of claim 1, wherein encoding the position of the last non-zero coefficient is achieved via entropy encoding.

12. The method of claim 11, wherein the entropy encoding comprises context adaptive binary arithmetic coding (CABAC).

13. The method of claim 12, wherein CABAC includes truncated codewords for a position of the last non-zero coefficient.

14. The method of claim 1, wherein encoding the position of the last non-zero coefficient comprises explicitly encoding the position of the last non-zero coefficient by signaling its X and Y coordinates independently.

15. The method of claim 1, wherein the position of the last non-zero coefficient is encoded prior to encoding positions of other non-zero coefficients.

16. The method of claim 1, wherein the entropy encoding comprises high efficiency video coding (HEVC).

17. The method of claim 1, wherein encoding comprises decoding, and wherein decoding identifies the position of the last non-zero coefficient within the video block.

18. The method of claim 1, wherein all context index values for the third video block are different from context index values for the first video block and the second video block.

19. An apparatus for encoding video, the apparatus comprising a video coder configured to:
   determine a position of a last non-zero coefficient within each of a first video block having a first width, a second video block having a second width different from the first width and a third video block having a third width different from the first width and the second width;
   determine a context index value for each bin index value for video blocks having at least the first width, the second width and the third width;
   encode the position of the last non-zero coefficient within each of the first video block, the second video block and the third video block as a string of binary values, wherein each binary value in said string corresponds to a bin index value encoded using a respective context index value; and
   encode at least one of the first video block, the second video block and the third video block using two-level significance map coding by:

dividing the at least one of the first video block, the second video block and the third video block into same-size two or more non-overlapping sub-blocks;

generating a respective significance map for each sub-block; and generating a level-1 significance map, wherein each sub-block corresponds to a position in the level-1 significance map and the position is set to 1 if the sub-block has at least one non-zero value, otherwise the position is set to 0, and wherein:

each of at least three context index values is shared across each the first video block and the second video block and a last context index value for the third video block is different from each of the first video block and the second video block.

20. The apparatus of claim 19, wherein the context index value is derived from the bin index value according to the equation: context index value=bin index value>>($\log_2$ ($TU_{size}$)−2) where >>indicates a shift operation and $TU_{size}$ refers to width of the video block.

21. The apparatus of claim 19, wherein the context index value is derived from the bin index value using a lookup table.

22. The apparatus of claim 21, wherein the lookup table includes a context model having three context index values for a block width of 8.

23. The apparatus of claim 22, wherein loss in coding efficiency associated with using three context index values is less than 1%.

24. The apparatus of claim 21, wherein the lookup table includes a context model having three context index values for a block width of 16.

25. The apparatus of claim 24, wherein loss in coding efficiency associated with using three context index values is less than 1%.

26. The apparatus of claim 21, wherein the lookup table includes a context model having six context index values for a block width of 16.

27. The apparatus of claim 26, wherein loss in coding efficiency associated with using six context index values is less than 1%.

28. The apparatus of claim 21, wherein the lookup table includes a context model having seven context index values for a block width of 16.

29. The apparatus of claim 28, wherein loss in coding efficiency associated with using seven context index values is less than 1%.

30. The apparatus of claim 19, wherein encoding the position of the last non-zero coefficient is achieved via entropy encoding.

31. The apparatus of claim 30, wherein the entropy encoding comprises context adaptive binary arithmetic coding (CABAC).

32. The apparatus of claim 31, wherein CABAC includes truncated codewords for a position of the last non-zero coefficient.

33. The apparatus of claim 19, wherein encoding the position of the last non-zero coefficient comprises explicitly encoding the position of the last non-zero coefficient by signaling its X and Y coordinates independently.

34. The apparatus of claim 19, wherein the position of the last non-zero coefficient is encoded prior to encoding positions of other non-zero coefficients.

35. The apparatus of claim 19, wherein the entropy encoding comprises high efficiency video coding (HEVC).

36. The apparatus of claim 19, wherein the video encoder comprises a video decoder configured to decode a position of a last non-zero coefficient within a video block.

37. The apparatus of claim 36, wherein the apparatus comprises at least one of: an integrated circuit; a microprocessor; and a wireless communication device that includes the video decoder.

38. The apparatus of claim 19, wherein the apparatus comprises at least one of:
an integrated circuit;
a microprocessor; and
a wireless communication device that includes the video encoder.

39. The apparatus of claim 19, wherein all context index values for the third video block are different from context index values for the first video block and the second video block.

* * * * *